(12) United States Patent
Blackledge

(10) Patent No.: US 8,311,776 B2
(45) Date of Patent: Nov. 13, 2012

(54) METHODS, SYSTEMS AND COMPUTER PROGRAM PRODUCTS FOR THROUGHPUT-TESTING OF ELECTRONIC DATA SYSTEMS

(75) Inventor: Robert Blackledge, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 422 days.

(21) Appl. No.: 12/629,028

(22) Filed: Dec. 1, 2009

(65) Prior Publication Data

US 2011/0131011 A1    Jun. 2, 2011

(51) Int. Cl.
- G06F 11/34 (2006.01)
- G06F 19/00 (2011.01)
- G06F 17/40 (2006.01)
- G01D 21/00 (2006.01)

(52) U.S. Cl. .................. 702/186; 73/865.9; 324/762.01; 370/241; 370/252; 375/224; 375/225; 702/17; 702/108; 702/117; 702/123; 702/127; 702/182; 702/187; 702/189

(58) Field of Classification Search ............... 73/432.1, 73/865.8, 865.9; 324/73.1, 500, 537, 600, 324/602, 603, 605, 612, 750.01, 762.01, 324/762.02, 762.03, 762.05, 762.06; 370/241, 370/252, 253; 375/224, 225; 702/1, 57, 702/79, 108, 117, 118, 123, 127, 179, 182, 702/186, 187, 189; 709/223, 224

See application file for complete search history.

(56) References Cited

U.S. PATENT DOCUMENTS

| | | | | |
|---|---|---|---|---|
| 3,082,374 A * | 3/1963 | Buuck | ............................ | 324/73.1 |
| 3,177,430 A * | 4/1965 | Smee et al. | .................... | 370/241 |
| 3,321,613 A * | 5/1967 | Searle | ........................... | 702/182 |
| 5,375,070 A * | 12/1994 | Hershey et al. | ................ | 709/224 |
| 5,951,705 A * | 9/1999 | Arkin et al. | .................... | 714/738 |
| 7,711,751 B2 * | 5/2010 | Kelley et al. | ................... | 707/791 |
| 2004/0054680 A1 * | 3/2004 | Kelley et al. | ................... | 707/100 |
| 2008/0002670 A1 * | 1/2008 | Bugenhagen et al. | ......... | 370/352 |
| 2012/0106379 A1 * | 5/2012 | Hamaguchi | .................... | 370/252 |

* cited by examiner

*Primary Examiner* — Edward Cosimano

(57) ABSTRACT

The Data Throughput Tester ("DTT") provides efficient and reliable methods to characterize the performance capabilities of electronic data systems. Embodiments of the DTT may allow test organizations to find the throughput limitations of a data system under test to the nearest whole packet in both an efficient and reliable manner. Embodiments of the DTT may allow determination of the throughput of a data system under test under the requirement that data output obtained from the data system is identical to the data input provided to the data system. Further embodiments of the DTT may allow determination of the throughput of a data system under test under the condition that specific performance characteristics of the data system under test satisfy pre-defined benchmark parameters. Further embodiments of the DTT may allow determination of the optimum throughput of a data system under test wherein different benchmark parameters are applied when testing the data system under different regimes of performance operating conditions. Further embodiments of the DTT highlighting various other advantageous aspects are discussed in the instant disclosure.

15 Claims, 7 Drawing Sheets

FIGURE 3

DATA THROUGHPUT TEST SYSTEM PARAMETER TABLE

| Label | Parameter Name | Parameter Type | | |
|---|---|---|---|---|
| | | Generation | Performance | Benchmark |
| 301 | Number of streams | X | X | X |
| 302 | Packet type | X | X | X |
| 303 | Stream length (number of packets / runtime | X | X | |
| 304 | Packet rate | X | X | |
| 305 | Packets lost | | X | |
| 306 | Packet loss rate | | X | |
| 307 | Packet delay | | X | |
| 308 | $P_{threshold}$ packet rate | | | X |
| 309 | Zero packet loss | | | X |
| 310 | $L_{threshold}$ packet loss | | | X |
| 311 | $R_{threshold}$ packet loss rate | | | X |
| 312 | $D_{threshold}$ packet delay | | | X |
| 313 | Line rate | X | | |

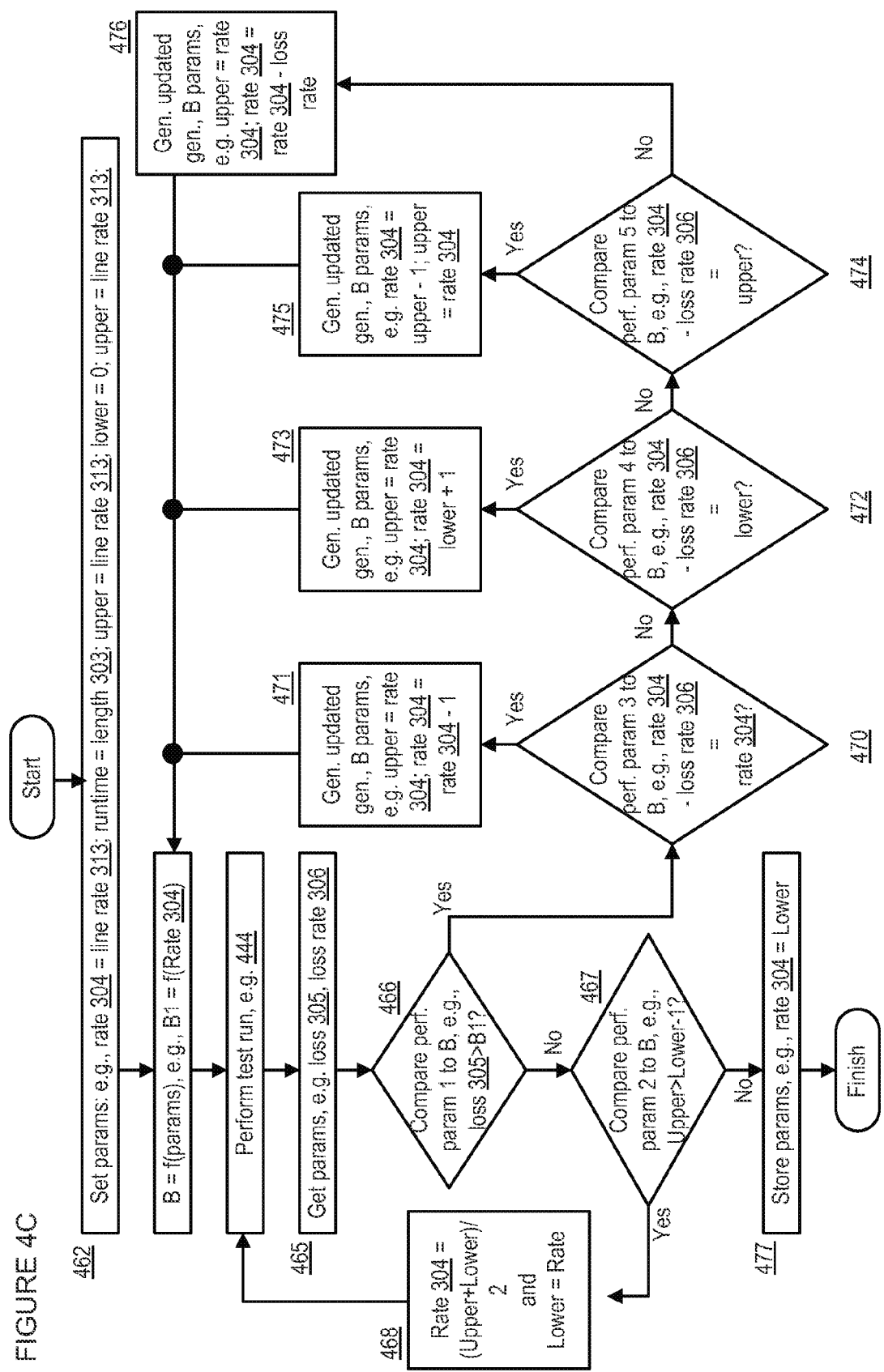

METHODS, SYSTEMS AND COMPUTER PROGRAM PRODUCTS FOR THROUGHPUT-TESTING OF ELECTRONIC DATA SYSTEMS

BACKGROUND

Streams of data may be transmitted and received between terminal systems via a data system comprising either a single electronic device or a plurality of interconnected electronic devices forming a network. The terminal systems may themselves be comprised of either a single electronic device or a plurality of interconnected electronic devices forming a network. The data system may transfer input data from the transmitting terminal system to the receiving terminal system, with a minimum amount of modification to the input data that is acceptable, at a maximum rate of transfer known as the throughput of the data system.

BRIEF DESCRIPTION OF THE DRAWINGS

The accompanying appendices and/or drawings illustrate various non-limiting, example, inventive aspects in accordance with the present disclosure:

FIG. 3 provides a table of DTT parameters that may be employed in one embodiment of DTT operation;

FIGS. 4A, 4B and 4C provide overview logic flow diagrams illustrating aspects of implementing a DTT system in one embodiment of the DTT.

Figure 1:
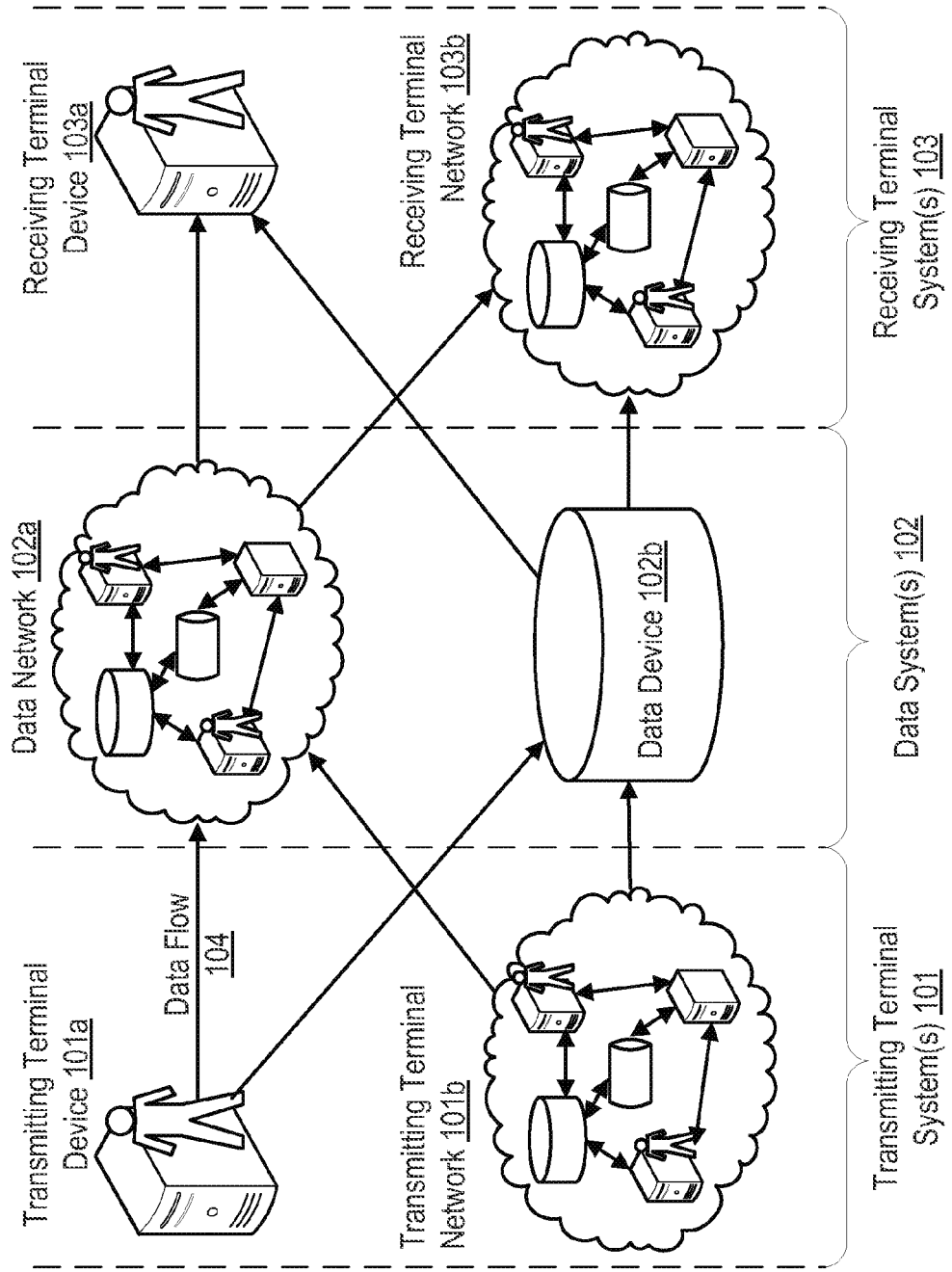
FIG. 1 provides an overview of the path of electronic data flow between transmitting and receiving terminal systems via data systems.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

This disclosure details the implementation of methods, systems and computer program products for a Data Throughput Tester (hereinafter "DTT"). The demands placed on electronic communication systems in the information technology (hereinafter "IT") age are growing rapidly with increased adoption of such communication methods. Meeting the electronic traffic loads associated with increased network usage requires that the maximum available bandwidth of IT infrastructure be utilized. Non-optimal utilization of available bandwidth can lead to several adverse scenarios, end-user dissatisfaction, loss of revenue for the network service provider, and greater costs for investment in IT infrastructure to accommodate existing and future traffic loads predicted to be placed on the network. Similarly, placing demands on an IT network beyond the capabilities of the network can result in adverse scenarios including loss of data packets (in the case of packet-switched networks) or denial of service.

Efficient and reliable methods to characterize the performance capabilities of IT network equipment are required by network service providers to ensure maximum utilization of available bandwidth and prevention of adverse scenarios including those described above. Accurate performance characterization may also be required by sellers of network equipment to convince potential buyers that the projected traffic loads on their IT networks can be adequately accommodated by the network equipment. Embodiments of the DTT may allow test organizations to find the throughput limitations of a data system under test to the nearest whole packet in both an efficient and reliable manner. Further embodiments of the DTT may allow determination of the throughput of a data system under test under the requirement that data output obtained from the data system is identical to the data input provided to the data system. Further embodiments of the DTT may allow determination of the throughput of a data system under test under the condition that specific performance characteristics of the data system under test satisfy pre-defined benchmark parameters. Further embodiments of the DTT may allow determination of the optimum throughput of a data system under test wherein different benchmark parameters are applied when testing the data system under different regimes of performance operating conditions. Further embodiments of the DTT highlighting various other advantageous aspects are discussed in the instant disclosure.

It is to be understood that, depending on the particular needs and/or characteristics of the DTT application, hardware configuration, network framework, data payload, monetization model and/or the like, various embodiments of the DTT may be implemented that enable a great deal of flexibility and customization. The instant disclosure discusses embodiments of the DTT within the context of IT network infrastructure. However, it is to be understood that the system described herein can be readily configured for a wide range of other applications or implementations. For example, embodiments of the DTT can be configured to test individual internal components of servers, desktop computers and/or the like.

FIG. 1 provides an overview of the path of electronic data flow between transmitting and receiving terminal systems via data systems. In FIG. 1, data systems 102 interact with transmitting terminal systems 101 and receiving terminal systems 103 to enable data 104 to be transferred from the transmitting terminal systems 101 to the receiving terminal systems 103. It is to be understood that, although FIG. 1 depicts the flow of data 104 from transmitting terminal systems 101 to receiving terminal systems 103, the communication links illustrated by data flow 104 in FIG. 1 may be simplex (unidirectional data transfer), half-duplex (non-simultaneous bidirectional data transfer), full-duplex (simultaneous bidirectional data transfer), or of any other kind. Further, it is also to be understood that the receiving terminal systems 103 may re-transmit the received data onwards to other systems, and likewise, the transmitting terminal systems 101 may have received the transmitted data from other sources prior to transmission to the receiving terminal systems 103.

The transmitting terminal systems 101, receiving terminal systems 103 and data systems 102 may form part of networks of different types and scales, be comprised of a wide range of communication devices, and utilize various technologies and protocols. As an example, in one embodiment, the systems 101-103 may form part of a Local Area Network, Wide Area Network, Virtual Private Network and/or the like. As another example, in one embodiment, the systems 101-103 may form part of an Optical Fiber Network, Wireless Network, Ethernet Network, Mixed Media Network and/or the like. As another example, in one embodiment, the systems 101-103 may utilize communications protocols including Transmission Control Protocol, Internet Protocol (hereinafter "IP"), Session Initiation Protocol, Voice over IP protocol and/or the like.

In one embodiment, the transmitting terminal system 101 may be a transmitting terminal device 101a including, but not limited to, a cellular telephony handset, blackberry, computer network interface card and/or the like. In another embodiment, a transmitting terminal network 101b may be comprised of a plurality of interconnected devices including, but not limited to, routers, switches, bridges, gateways, servers and/or the like. In another embodiment, the transmitting terminal device 101a or network 101b may be the source of multiple streams of data to be communicated to a receiving terminal system 103. Similarly, in one embodiment, a receiving terminal system may be a terminal receiving device 103a or a terminal receiving network 103b comprised of a plurality of interconnected devices. For example, in one embodiment, the receiving terminal system 103 may be a receiving terminal device 103a including, but not limited to, a cellular telephony handset, blackberry, computer network interface card and/or the like. In another embodiment, a receiving terminal network 103b may be comprised of a plurality of interconnected devices including routers, switches, bridges, gateways, servers and/or the like. In one embodiment, the receiving terminal system 102 may receive one or more separate streams of data transmitted from a terminal transmitting system 101 via a data system 102

A data stream 104 may be composed of a plurality of data packets, and may facilitate communication of messages of different types including, but not limited to, file transfers, electronic mail messages, short messages service messages, text messages, multimedia messages including, but not limited to, pictures and videos, and/or the like. The packets may be formatted according to a number of available formats, including, for example, the PPP general frame format. The packets comprising the data stream 104 may be transferred from a transmitting terminal system 101 to a receiving terminal system 103 via a data system 102. The data system 102 may transmit one or more streams of data 104 (also referred to herein as traffic) from a transmitting terminal system 101 to a receiving terminal system 103. The data system 102 may be comprised of plurality of interconnected communication devices including, but not limited to, routers, switches, bridges, gateways, servers and/or the like, forming a data network 102a, or a single device 102b, including, but not limited to, a router, switch, bridge, gateway, computer network interface card, an internal component of a computer and/or the like.

Figure 2:
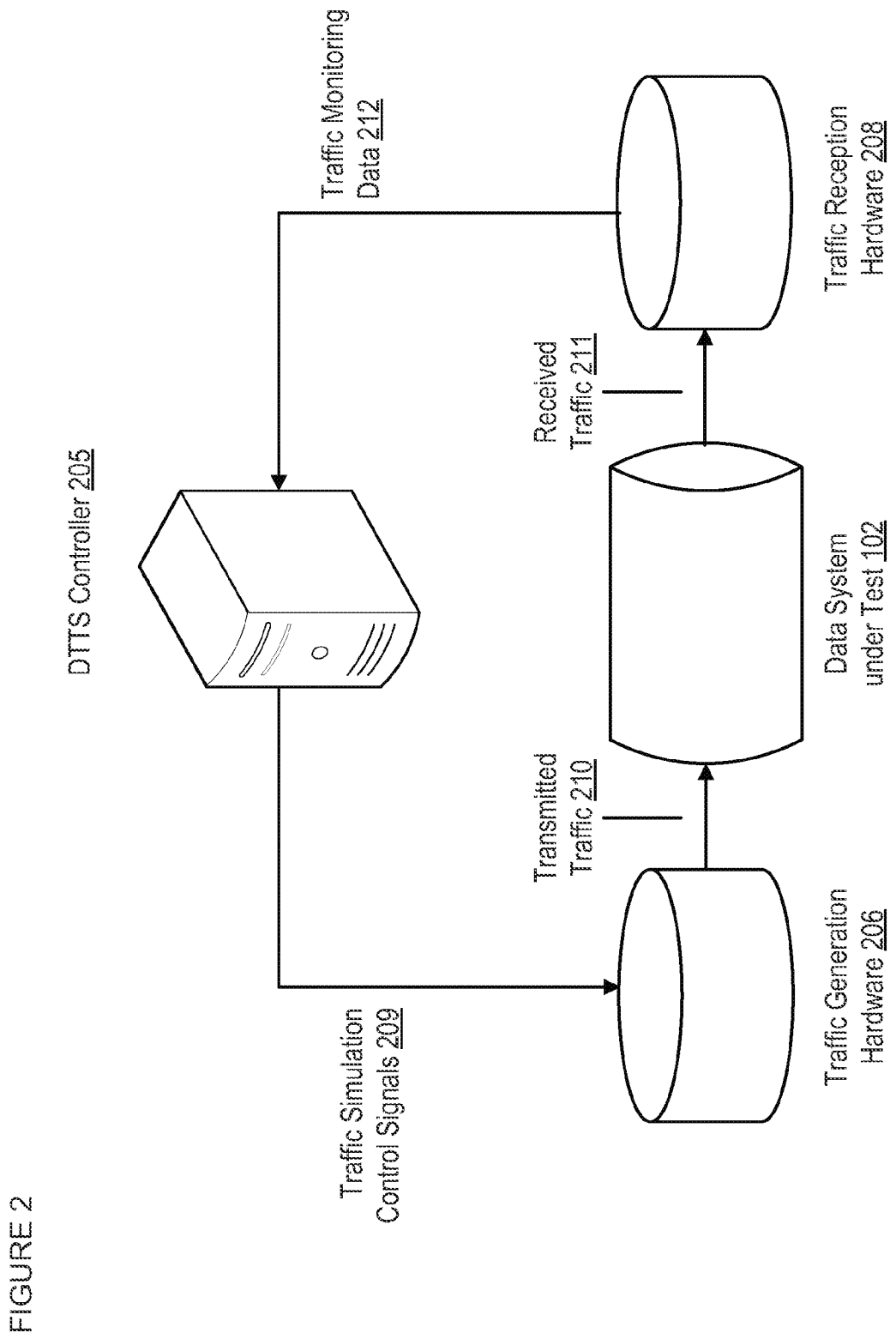
FIG. 2 is of a block diagram illustrating an implementation of the DTT components in one embodiment of the DTT.

FIG. 2 shows a block diagram illustrating an implementation of the DTT components in one embodiment of DTT operation. The DTT may comprise a DTT controller 205 configured to communicate with traffic generation hardware 206 and traffic reception hardware 208. For example, in one embodiment, the DTT controller 205, traffic generation hardware 206 and traffic reception hardware 208 may be in communication with each other through an Internet Protocol computer network. In another embodiment, the DTT controller may be connected to the traffic generation hardware 206 and traffic reception hardware 208 through USB, IEEE-488 ports and/or the like.

The DTT controller 205 may provide traffic simulation control signals 209 to the traffic generation hardware 206 via the communication interface to configure the operation of the traffic generation hardware 206. For example, in one embodiment, the DTT controller 205 may comprise a computer from which a UNIX command line interface may be employed and UNIX commands such as the 'rsh' remote shell command may be used to control the operation of the traffic generation hardware 206 and traffic reception hardware 208 over a computer network. In another embodiment, the DTT controller 205' may comprise a computer within which an integrated development environment, such as LABVIEW™, MATLAB®, MICROSOFT VISUAL STUDIO and/or the like may be installed, Software program routines may be developed within the integrated development environment to use ports available to the computer in the DTT controller 205, including RS-232, USB, IEEE-488 ports and/or the like, to control the traffic generation hardware 206 and traffic reception hardware 208. The traffic simulation control signals 209 may serve to configure the characteristics of the traffic 210 generated by the traffic generation hardware 206 in order to simulate realistic traffic patterns that the data system under test 102 may experience in a particular application for which the data system under test 102 is being tested. The traffic simulation control signals 209 may also serve as a trigger to initiate the generation of traffic by the traffic generation hardware.

Traffic generation hardware 206 may be configured to generate one or more data streams of transmitted traffic 210 responsive to the issuance of traffic simulation control signals 209 by the DTT controller 205. In one embodiment, the traffic generation hardware 206 may comprise a computer connected to an Internet Protocol computer network and which may send large file(s) such as a collection of mp3 music files or mpeg videos using standard FTP commands. For example, the computer may open a connection to the data system under test 102 using an 'open' command and transfer a collection of files using FTP 'put', 'mput' commands and/or the like. In another embodiment, the traffic generation hardware may be a an Input/Output (I/O) printed circuit board (PCB), such as a National Instruments PCI DAQ card and/or the like. The I/O card may be installed in a peripheral card slot of a motherboard in a computer within the DTT controller 205, and the computer may use software routines developed in an integrated development environment to control the output of the I/O card. The software routine may simply generate random bits of data and output them through the board, or may utilize files stored in the computer, including digitally signed documents, music files or streaming video for output through the I/O card. The transmitted traffic 210 may be provided as one or many streams, in a continuous fashion, in a single burst at a high transfer rate, or in multiple bursts of traffic at high transfer rates, or in combinations thereof, depending on the testing requirements.

The data system under test 102 may be any kind of electronic system which handles data, including, but not limited to, a local area network, wide area network, wireless network, mixed-mode network, a network router, gateway, bridge, switch, or internal component of a computer such as a network card, graphics/video card, any other printed circuit board, or memory or data bus interface. The data system under test 102 may attempt to obtain the transmitted traffic 210 at its input from the traffic generation hardware 206 and faithfully provide it at the output of the data system under test 102. In one embodiment, this may mean that the data system under test reproduces data received at its input without any modification at its output. In another embodiment, the data system under test may be required to reproduce the data presented at its input, with a maximum allowable amount of modification defined by a set of benchmark parameters, at the output of the data system under test 102.

The data system under test 102 may produce streams of received traffic 211, which can then be collected by traffic reception hardware 208. In one embodiment, traffic reception hardware 208 may comprise a computer connected to an Internet Protocol computer network and which may receive the data using standard FTP commands. For example, the computer may open a connection to the data system under test 102 using an 'open' command and obtain the output from the data system under test 102 using FTP 'get', 'mget' commands and/or the like. In another embodiment, the traffic generation hardware may be a an Input/Output (I/O) printed circuit board (PCB), such as a National Instruments PCI DAQ card and/or the like. The I/O card may be installed in a peripheral card slot of a motherboard in a computer within the DTT controller 205, and the computer may use software routines developed in an integrated development environment to receive input from the I/O card. The traffic reception hardware 208 may be configured to provide, responsive to reception of received traffic 211, streams of traffic monitoring data 212, which may be comprised of the actual received data, or specific information extracted from the received data, such as checksum/ parity information and/or the like. In one embodiment, the traffic reception hardware may provide a UNIX command line interface. A variety of UNIX commands, including 'ping', 'netstat', 'netpmon', 'traceroute' and 'ipreport' commands may be used to obtain a detailed packet-by-packet analysis of the performance of the data system under test 102. In another embodiment, software routines running within an integrated development environment may be used for statistical analysis of the received data. In another embodiment, the traffic reception hardware 206 may simply dump all the received data into a memory module for data processing and analysis by the DTT controller 205. In one embodiment, the traffic monitoring data 212 is sent back to the DTT controller 205 for further data processing and analysis.

It is to be understood that the functions of generating traffic simulation control signals 209, receiving traffic monitoring data 212, and performing further data processing and analysis may be performed by a single DTTT controller 205, or by separate controllers, each dedicated to a function, or by a plurality of DTT controllers sharing the processing load associated with these functions in a distributed manner.

FIG. 3 provides a table of DTT parameters that may be employed in one embodiment of DTT operation. In one implementation, the DTT controller 205 may configure the traffic generation hardware 206 to generate as many data streams as the number of streams 301, with each stream comprised of a plurality of data packets of type packet type 302, each data stream of length stream length 303, wherein each data stream is generated at a data rate prescribed by packet rate 304. In one implementation, the packet rate 304 may be a constant, whereas, in another embodiment, the data rate may vary as a function of time 304. Moreover, in various implementations, the packet type 302, stream length 303, and number of streams 301 may be varied dynamically in independent or co-dependent fashion to generate a wide variety of testing conditions to test the data system under test 102. The DTT controller 205 may configure the traffic generation hardware to generate data streams at a maximum line rate 313. In one implementation, the line rate 313 may be established by the maximum available bandwidth of the physical communication link (for example, optical fiber, coaxial cable and/or the like) between the traffic generation hardware 206 and the data system under test 102. The maximum available bandwidth may be estimated by experimentation or by estimating the value based on previous experience and/or consulting relevant datasheets detailing the characteristics of the physical communication link employed. The line rate 313 may, in some implementations, provide an upper bound for data rates to which the data system under test 102 may be subjected. The choice of boundary conditions within which the throughput of the data system under test 102 is searched for may impact the efficiency with which the throughput is determined.

Referring again to the parameters shown in FIG. 3 that may be employed in one embodiment of the DTT, the data system under test 102 may, in response to input of the data streams in transmitted traffic 210 into it, generate streams of data in received traffic 211. The received traffic 211 may be analyzed to extract information related to the performance of the data system under test 102. In one implementation, the performance parameters may include, but not be limited to, number of streams 301, the packet type 302, stream lengths 303 and packet rate 304. The data system under test may sometimes not be able to exactly provide at its output the data supplied at its input without modification, and may, for example, delay output of certain packets, or lose packets altogether from its output data streams in received traffic 211, or distort the data in some other manner. In one implementation, the average packet delay 307, number of packets lost 305 and packet loss rate 306 may also be determined as performance parameters. In one implementation, the packet loss rate 306 may be calculated as the number of packets lost 305 per unit packet input into the data system under test 102. In another implementation, the packet loss rate may be determined relative to the length in time of the input data stream. It is to be understood that the performance parameters 301-307 listed above can be computed in a number of other manners without impacting the ability of the DTT to determine the throughput of the data system under test 102. It is also to be understood that various other parameters may be determined to characterize the performance of the data system under test 102.

The performance parameters 301-307 may be analyzed to determine whether the performance of the data system under test is satisfactory by comparing the performance parameters 301-307 against a set of benchmark parameters 301-302 and 308-312. These benchmarks parameters may include, but not be limited to, threshold packet rate 308, zero packet loss 309, finite non-zero threshold packet loss 310, threshold packet loss rate 311 and average threshold packet delay 312. In one implementation, the benchmark parameters may be pre-defined and static in nature. In another implementation, the benchmark parameters employed may be varied as the throughput determination process progresses, and the values of the benchmark parameters employed may also be varied as the DTT progress through the process of determining the throughput of the data system under test 102, described in detail later in the instant disclosure. In one implementation, the benchmark parameters may be varied responsive to the packet rate at which the data system under test 102 is tested. In another implementation, the benchmark parameters may be varied according to the regime, defined by the generation parameters, within which the data system under test is tested. In another implementation, the benchmark parameters may be updated even for small variations in the operating test conditions, as defined by the generation and/or performance parameters.

In one implementation of the DTT, the performance parameters 301-307 may be compared against the benchmark parameters 301-302 and 308-312 to determine whether the data system under test 102 operates with sufficient efficiency on traffic generated based on the generation parameters 301-304 and 313. If the data system under test 102 is deemed to not satisfy the requisite criteria as defined by the set of benchmark parameters, then the generation parameters 301-304 and 313 may be modified, for example, by lowering generation packet rate 304. In one implementation, the performance parameters 301-307 may be further utilized to determine the type and amount of modification of the generation parameters 301-304 and 313. In one implementation. the new generation parameters 301-304 and 313 may then be utilized to re-test the data system under test 102 and determine new performance parameters 301-307. In another implementation, the generation parameters 301-304 and 313 may be iteratively modified until a determination is made as to whether the performance parameters 301-307 satisfy the requirements as prescribed by the set of benchmark parameters 301-302 and 308-312.

Figure 4A:
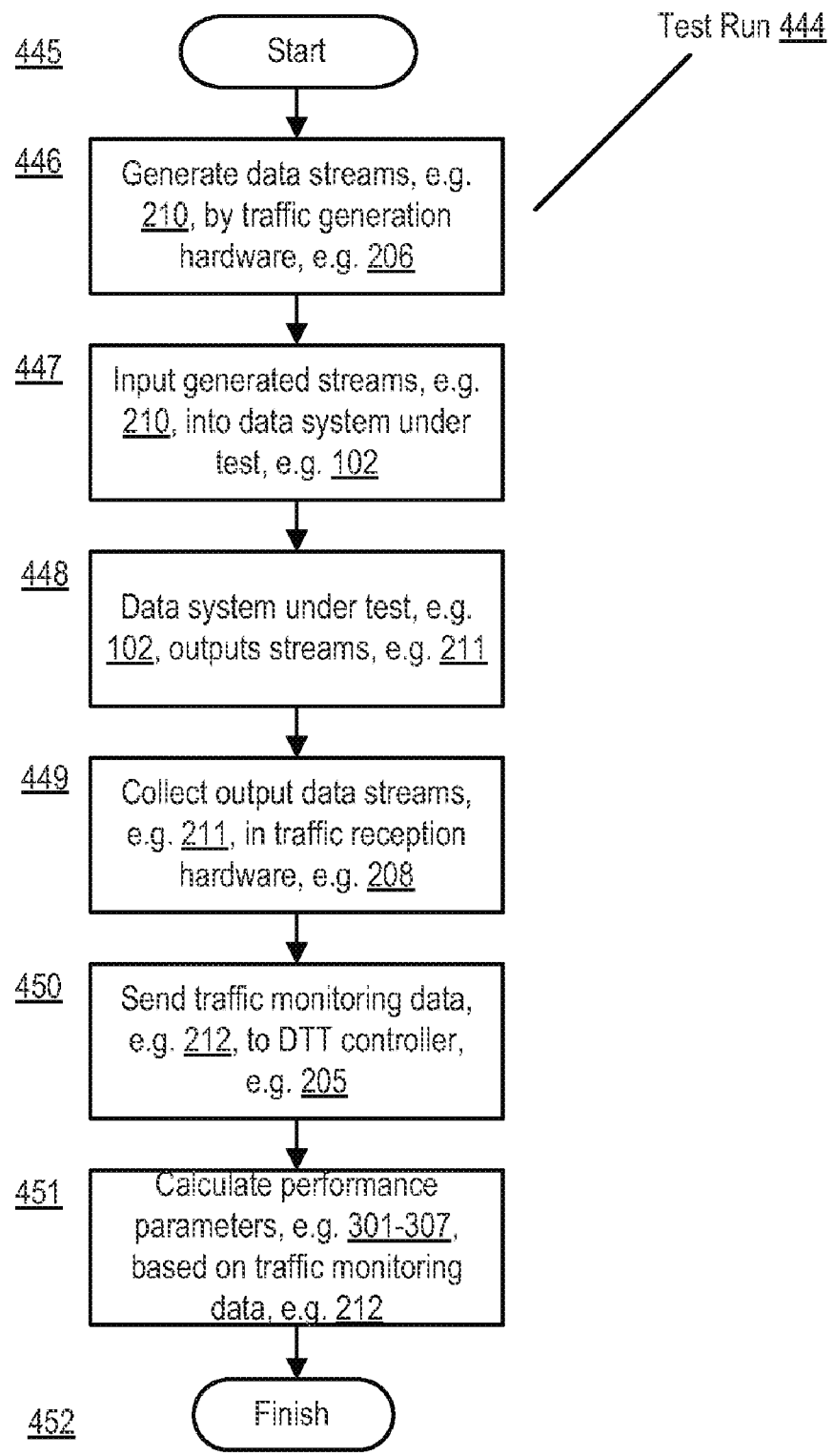
Figure 4B:
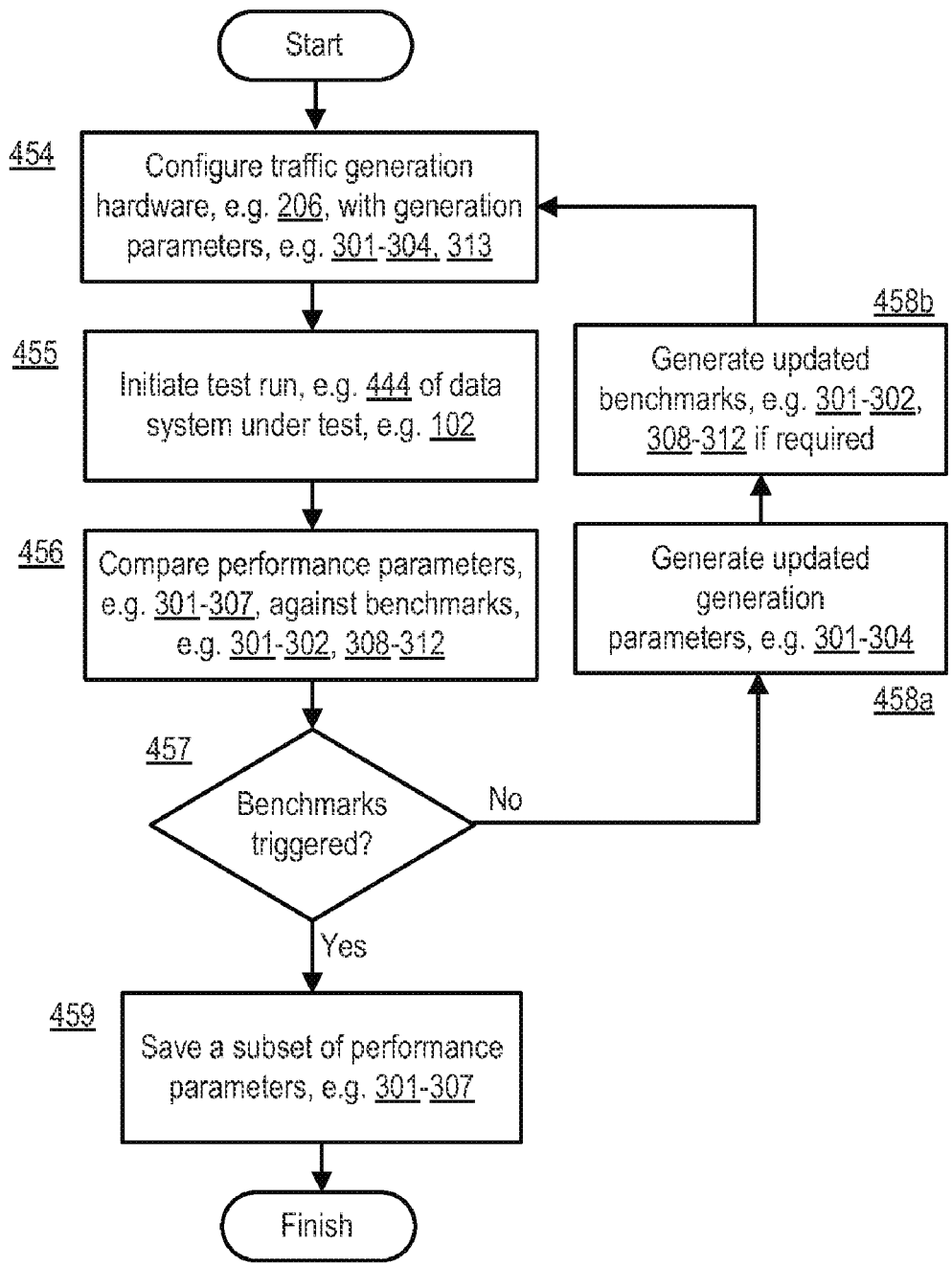

FIGS. 4A, 4B and 4C provide overview logic flow diagrams illustrating aspects of implementing a DTT system in one embodiment of DTT system operation. Referring to FIG. 4A, a test run 444 of the data system under test 102 may be performed to determine a set of performance parameters 301-307 associated with a set of generation parameters 301-304 and 313. The test run 444 may begin as in element 445 by configuring the traffic generation hardware 206, as in element 446, to generate data streams corresponding to transmitted traffic 210. The generated data streams 210 may be provided, as depicted in element 447, to the data system under test 102. In response to the transmitted traffic 210, the data system under test 102 may provide data streams corresponding to received traffic 211, as depicted in element 448. The data streams in received traffic 211 may, as depicted in element 449, be collected in traffic reception hardware 208. Traffic reception hardware 208 may generate traffic monitoring data 212, which may then be sent to DTT controller 205, as depicted in element 450. The DTT controller 205 may calculate performance parameters 301-307, as depicted in element 451, based on the traffic monitoring data 212, after which the test 444 is finished, as depicted in element 452.

Referring now to FIG. 4B, the test run 444 may, in one implementation, be incorporated into an iterative procedure 454-458b to determine the best-possible performance of the data system under test 102. In one implementation, the traffic generation hardware 206 may be configured, as depicted in 454, to generate data streams as transmitted traffic 210 based on generation parameters 301-304 and 313. The generated data streams may be utilized, as depicted in 455, in a test run 444 of the data system under test 102, resulting in the calculation of performance parameters 301-307 associated with the current generation parameters 301-304 and 313. A subset of the performance parameters 301-307 may be compared against a subset of the benchmark parameters 301-302 and 308-312, as shown in 456. A determination may be made as to whether a second test run 444 need be performed, as shown in 457, based on the comparison of the subset of the performance parameters 301-307 against the subset of the benchmarks 301-302 and 308-312. If it is determined that the performance parameters 301-307 do not satisfy the requirements as prescribed by the benchmark parameters 301-302 and 308-312, a subset of the generation parameters 301-304 may be modified prior to performing a second test run 444, as shown in 458a. The generation parameters from 301-304 and 313 to be modified and the amount by which those generation parameters are to be modified may be determined based on the performance parameters 301-307 calculated from, a previous iteration. The benchmark parameters 301-302 and 308-312 may also be updated, as shown in 458b, for performing a subsequent iteration in the procedure. The benchmark parameters for a subsequent iteration may be determined based on the performance parameters 301-307 calculated from the previous run and/or the current generation parameters and/or the generation parameters 301-304 and 313 from a previous iteration. The modified generation parameters 301-304 and 313 may be utilized to re-configure the traffic generating hardware 206, as in 454, for performing a subsequent test run 444. This iterative procedure 454-458b may be performed until a determination is made that a subsequent test run 444 need not be run again. If a determination is made that a subsequent test run 444 need not be performed again, a subset of the performance parameters 301-307 may be stored, as shown in 459, as the result of the iterative procedure 454-458b, and as a measure of the best-case throughput of the data system under test 102 for operating in a particular regime of operation for a particular application.

One implementation of the DTT may allow the determination of the throughput limitations of a data system under test 102 to the nearest whole data packet in both an efficient and reliable manner. FIG. 4C shows the logic flow diagram illustrating aspects of an exemplary embodiment of DTT operation. Referring now to FIG. 4C, iterative procedure 462-476 may be implemented to determine the throughput of a data system under test 102 lying between the lower bound of zero and upper bound of line rate 313 (as shown in 462). The values of these lower and upper bounds may be varied, as may the values of a set of benchmark parameters B, procedure steps through iterations. The traffic generation hardware 206 may initially be configured to generate data at a specific rate, for example, at the line rate 313. The traffic generation hardware 206 may generate transmitted traffic 210 for runtime 303. The transmitted traffic 210 may be utilized in a test run 444 of the data system under test 102. The test run 444 may result in calculation of performance parameters 301-307 associated with the current generation parameters. The number of lost packets 305 may be among the performance parameters determined, as shown in 465. A determination may be made as to whether test run 444 need be performed again based on comparing the performance parameters against a set of benchmarks (shown as B in FIG. 4C). If it is determined that no packets were lost (466, decision no), it may be further determined that the data system under test 102 has not been tested at its maximum throughput rate (467, decision yes). If these two determinations are made, then it may be determined that a test run 444 needs to be performed again, the generation parameter packet rate 304 for the subsequent test run 444 may be increased, as shown in 468, and the lower bound of possible throughput values may be limited to the previous packet rate 304. Updated benchmark parameters B may also be generated and the updated benchmarks may be used in a subsequent iteration of the procedure.

However, if it is determined that number of packets lost 305 in the previous test run 444 is non-zero (as shown in 466, decision yes), then it may be determined that the test run 444 needs to be performed again and the packet loss rate 305 may be calculated. The generation parameters, e.g. packet rate 304 for a subsequent test run 444 may be determined based on the performance parameters loss rate 306, the current data rate 304, and the dynamically-modified upper and lower bound values for throughput of the data system under test 102. If it is determined that the loss rate is very small (470, decision yes), then it may be determined that the throughput of the data system under test 102 may be close to the upper bound value for the throughput. The generation rate 304 for the subsequent test run 444 may then be reduced by a small number; for example, the data rate may be reduced by 1, as shown in 474, and the upper bound, among other benchmark parameters, modified accordingly, as shown in 471. If it is determined that the difference between the current packet rate 304 and the loss rate 306 approximately equals the lower bound for the throughput of the data system under test 102 (470 decision no; 472 decision yes), then it may be determined that the actual throughput for the data system under test 102 may be close to the current lower bound value, and the generation and benchmark parameters may be modified accordingly, as shown in 473. If it is determined that the difference between the current packet rate 304 and the loss rate 306 approximately equals the upper bound for the throughput of the data system under test 102 (472 decision no; 474 decision yes), then it may be determined that the actual throughput of the data system under test 102 may lie close to the upper bound value for the throughput. The upper bound for the throughput, among other benchmark parameters, and generation parameter packet rate 304 for the subsequent test run 444 may then be modified accordingly, as shown in 475. If it is determined that current packet generation rate 304 is significantly different from the boundary values and the loss rate 306 is significant (474 decision no), then it may be determined that the best packet generation rate to perform the subsequent test run 444 may lie approximately at the difference between the current packet generation rate 304 and the associated packet loss rate 306, and the generation parameter packet rate 304 for the subsequent test run 444 may be modified accordingly along with appropriate benchmark parameters such as the upper bound, as shown in 476. If it is determined that no packets were lost in a test run 444, and that the packet rate of the previous test run 444 was at the maximum possible value dependent on the comparison with the benchmark parameters (467 decision no), then it may be determined that the throughput of the data system under test 102 may be, to the nearest whole packet, equal to the packet generation rate 304 of the previous test run 444, and this parameter, among other parameters, may be stored as the result of iterative procedure 477.

Figure 5:
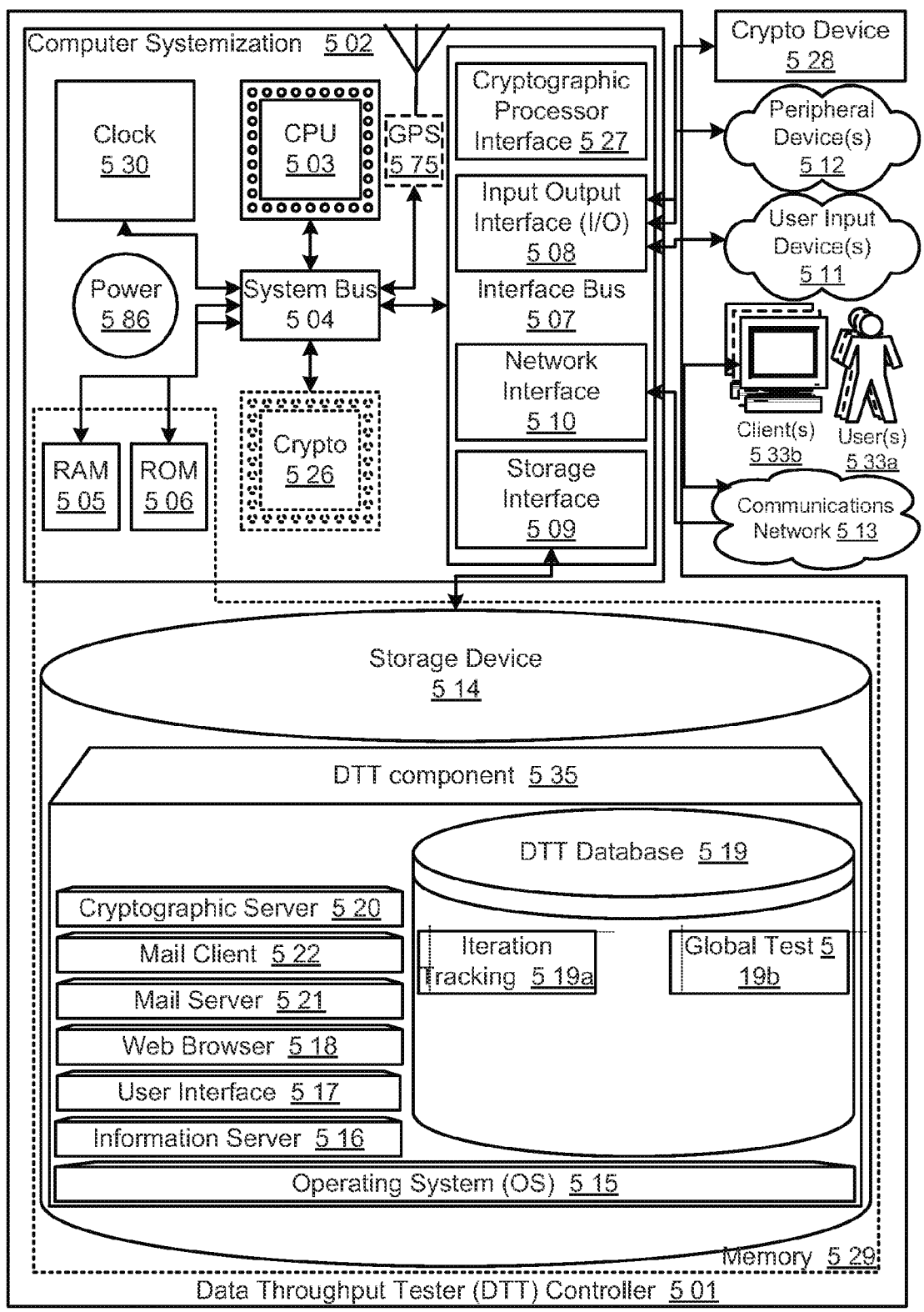
FIG. 5 is of a block diagram illustrating embodiments of the DTT controller.

FIG. 5 illustrates inventive aspects of a DTT controller 501 in a block diagram. In this embodiment, the DTT controller 501 may serve to aggregate, process, store, search, serve, identify, instruct, generate, match, and/or facilitate interactions with a computer through various information technologies, and/or other related data.

Typically, users, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DTT controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DTT controller 501 may be based on computer systems that may comprise, but are not limited to, components such as: a computer systemization 502 connected to memory 529.

A computer systemization 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effect communications, operations, storage, etc. Optionally, the computer systemization may be connected to an internal power source 586. Optionally, a cryptographic processor 526 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's ATHLON, DURON and/or OPTERON; ARM's application, embedded and secure processors; IBM and/or MOTOROLA'S DRAGONBALL and POWERPC; IBM's and SONY'S CELL processor; INTEL'S CELERON, CORE (2) DUO, ITANIUM, PENTIUM, XEON, and/or XSCALE; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DTT controller and beyond through various interfaces. Should processing requirements dictate a greater amount speed and/or capacity, distributed processors (e.g., Distributed DTT), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DTT may be achieved by implementing a microcontroller such as CAST's R8051XC2 microcontroller; Intel's MCS 51 (i.e., 8051 microcontroller); and/or the like. Also, to implement certain features of the DTT, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DTT component collection (distributed or otherwise) and/or features may be implemented via the microprocessor and/or via embedded components; e.g., via ASIC, coprocessor, DSP, FPGA, and/or the like. Alternately, some implementations of the DTT may be implemented with embedded components that are configured and used to achieve a variety of features or signal processing.

Depending on the particular implementation, the embedded components may include software solutions, hardware solutions, and/or some combination of both hardware/software solutions. For example, DTT features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DTT features. A hierarchy of programmable interconnects allow logic blocks to be interconnected as needed by the DTT system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the DTT may be developed on regular FPGAs and then migrated into a fixed version that more resembles ASIC implementations. Alternate or coordinating implementations may migrate DTT controller features to a final ASIC instead of or in addition to FPGAs. Depending on the implementation all of the aforementioned embedded components and microprocessors may be considered the "CPU" and/or "processor" for the DTT.

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the DTT thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: ACCELERATED GRAPHICS PORT (AGP), CARD BUS, (EXTENDED) INDUSTRY STANDARD ARCHITECTURE ((E)ISA), MICRO CHANNEL ARCHITECTURE (MCA), NUBUS, PERIPHERAL COMPONENT INTERCONNECT (EXTENDED) (PCI(X)), PCI EXPRESS, PERSONAL COMPUTER MEMORY CARD INTERNATIONAL ASSOCIATION (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the DTT controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DTT), architectures may similarly be employed to pool, load balance, and/or otherwise increase the communicative bandwidth required by the DTT controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 may be card readers, dongles, finger print readers, gloves, graphics tablets, joysticks, keyboards, mouse (mice), remote controls, retina readers, trackballs, trackpads, and/or the like.

Peripheral devices 512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the DTT controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the DTT controller. A MC68HC16 microcontroller, manufactured by MOTOROLA INC., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may allo be configured as part of CPU. Equivalent microcontrollers and/or processors may also be used. Other commercially available specialized cryptographic processors include: the BROADCOM'S CRYPTONETX and other SECURITY PROCESSORS; NCIPHER'S NSHIELD, SAFENET'S LUNA PCI (e.g., 7100) series; SEMAPHORE COMMUNICATIONS' 40 MHZ ROADRUNNER 184; SUN'S CRYPTOGRAPHIC ACCELERATORS (e.g. ACCELERATOR 6000 PCIE BOARD, ACCELERATOR 500 DAUGHTERCARD); VIA NANO PROCESSOR (e.g., L2100, L2200, U2400) line, which is capable of performing 500+ MB/s of cryptographic instructions; VLSI Technology's 33 MHz 6868; and/or the like.

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the DTT controller and/or a computer systemization may employ various forms of memory 529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the DTT component(s) 535; and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like.

The operating system component 515 is an executable program component facilitating the operation of the DTT controller. Typically, the operating system facilitates access of I/O, network interfaces, peripheral devices, storage devices, and/or the like. The operating system may be a highly fault tolerant, scalable, and secure system such as: APPLE MACINTOSH OS X (SERVER); AT&T PLAN 9; BE OS; UNIX and UNIX-like system distributions (such as AT&T's UNIX; BERKLEY SOFTWARE DISTRIBUTION (BSD) variations such as, FREEBSD, NETBSD, OPENBSD and/or the like; LINUX distributions such as RED HAT, UBUNTU, and/or the like); and/or the like operating systems. However, more limited and/or less secure operating systems also may be employed such as APPLE MACINTOSH OS, IBM OS/2, MICROSOFT DOS, MICROSOFT WINDOWS 2000/2003/ 3.1/95/98/CE/MILLENIUM/NT/VISTA/XP (SERVER), PALM OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DTT controller to communicate with other entities through a communications network 513. Various communication protocols may be used by the DTT controller as a subcarrier transport mechanism for interaction, such as, but not limited to: multicast, TCP/IP, UDP, unicast, and/or the like.

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as ACTIVE SERVER PAGE (ASP), ACTIVEX, (ANSI) (OBJECTIVE-) C (++), C# AND/OR .NET, COMMON GATEWAY INTERFACE (CGI) SCRIPTS, DYNAMIC (D) HYPERTEXT MARKUP LANGUAGE (HTML), FLASH, JAVA, JAVASCRIPT, PRACTICAL EXTRACTION REPORT LANGUAGE (PERL), HYPERTEXT PRE-PROCESSOR (PHP), PIPES, PYTHON, WIRELESS APPLICATION PROTOCOL (WAP), WEBOBJECTS, and/or the like. The information server may support secure communications protocols such as, but not limited to, File Transfer Protocol (YIP); HyperText Transfer Protocol (HTTP); Secure Hypertext Transfer Protocol (HTTPS), Secure Socket Layer (SSL), messaging protocols (e.g., AMERICA ONLINE (AOL) INSTANT MESSENGER (AIM), APPLICATION EXCHANGE (APEX), ICQ, INTERNET RELAY CHAT (IRC), MICROSOFT NETWORK (MSN) MESSENGER SERVICE, PRESENCE AND INSTANT MESSAGING PROTOCOL (PRIM), INTERNET ENGINEERING TASK FORCE'S (IETF'S) SESSION INITIATION PROTOCOL (SIP), SIP FOR INSTANT MESSAGING AND PRESENCE LEVERAGING EXTENSIONS (SIMPLE), OPEN XML-BASED EXTENSIBLE MESSAGING AND PRESENCE PROTOCOL (XMPP) (I.E., JABBER OR OPEN MOBILE ALLIANCE'S (OMA'S) INSTANT MESSAGING AND PRESENCE SERVICE (IMPS)), YAHOO! INSTANT MESSENGER SERVICE, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DTT controller based on the remainder of the HTTP request. For example, a request such as "http://123.124.125.126/myInformation.html" might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DTT database 519, operating systems, other program components, user interfaces, Web browsers, and/or the like.

Access to the DTT database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DTT. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DTT as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, strollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the APPLE MACINTOSH OPERATING SYSTEM'S AQUA, IBM'S OS/2, MICROSOFT'S WINDOWS 2000/2003/3.1/95/98/ CE/MILLENIUM/NT/XP/VISTA/7 (I.E., AERO), UNIX'S X-WINDOWS (e.g., which may include additional UNIX graphic interface libraries and layers such as K DESKTOP ENVIRONMENT (KDE), MYTHTV and GNU NETWORK OBJECT MODEL ENVIRONMENT (GNOME)), web interface libraries (e.g., ACTIVEX, AJAX, (D)HTML, FLASH, JAVA, JAVASCRIPT, etc. interface libraries such as, but not limited to, DOJO, JQUERY(UI), MOOTOOLS, PROTOTYPE, SCRIPT.ACULO.US, SWFOBJECT, YAHOO! USER INTERFACE, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

A Web browser component 518 is a stored program component that is executed by a CPU. The Web browser may be a conventional hypertext viewing application such as MICROSOFT INTERNET EXPLORER OR NETSCAPE NAVIGATOR. Secure Web browsing may be supplied with 128 bit (or greater) encryption by way of HTTPS, SSL, and/or the like. Web browsers allowing for the execution of program components through facilities such as ACTIVEX, AJAX, (D)HTML, FLASH, JAVA, JAVASCRIPT, web browser plug-in APIs (e.g., FIREFOX, SAFARI PLUG-IN, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the DTT enabled nodes. The combined application may be nugatory on systems employing standard Web browsers.

A mail server component 521 is a stored program component that is executed by a CPU 503. The mail server may be a conventional Internet mail server such as, but not limited to SENDMAIL, MICROSOFT EXCHANGE, and/or the like. The mail server may allow for the execution of program components through facilities such as ASP, ACTIVEX, (ANSI) (OBJECTIVE-) C (++), C# AND/OR .NET, CGI SCRIPTS, JAVA, JAVASCRIPT, PERL, PHP, PIPES, PYTHON, WEBOBJECTS, and/or the like. The mail server may support communications protocols such as, but not limited to: INTERNET MESSAGE ACCESS PROTOCOL (IMAP), MESSAGING APPLICATION PROGRAMMING INTERFACE (MAPI)/MICROSOFT EXCHANGE, POST OFFICE PROTOCOL (POP3), SIMPLE MAIL TRANSFER PROTOCOL (SMTP), and/or the like. The mail server can route, forward, and process incoming and outgoing mail messages that have been sent, relayed and/or otherwise traversing through and/or to the DTT.

Access to the DTT mail may be achieved through a number of APIs offered by the individual Web server components and/or the operating system.

Also, a mail server may contain, communicate, generate, obtain, and/or provide program component, system, user, and/or data communications, requests, information, and/or responses.

A mail client component 522 is a stored program component that is executed by a CPU 503. The mail client may be a conventional mail viewing application such as APPLE MAIL, MICROSOFT ENTOURAGE, MICROSOFT OUTLOOK, MICROSOFT OUTLOOK EXPRESS, MOZILLA, THUNDERBIRD, and/or the like. Mail clients may support a number of transfer protocols, such as: IMAP, MICROSOFT EXCHANGE, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DTT may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like.

The cryptographic component supports encryption schemes allowing for the secure transmission of information across a communications network to enable the DTT component to engage in secure transactions if so desired. The cryptographic component facilitates the secure accessing of resources on the DTT and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DTT database component 519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DTT database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the DTT database is implemented as a data-structure, the use of the DTT database 519 may be integrated into another component such as the DTT component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-519b. An iteration tracking table 519a includes fields such as, but not limited to: a generation parameters, performance parameters, benchmark parameters, iteration statistics, checksum data, DTT calibration fields, data system properties and other information associated with each process iteration and/or the like. The iteration tracking table may track all data processing operations as the DTT steps through the processing required for throughput determination. A global test table 519b includes fields such as, but not limited to: long-term reliability test parameters, quality control test parameters, batch monitoring, and/or the like. The test parameter table may track the parameters associated with large-scale testing of large volumes of data systems under test, including data related to batch random/cycle testing, quality control statistics, overall performance reliability and other large-scale testing data.

In one embodiment, the DTT database may interact with other database systems. For example, employing a distributed database system, queries and data access by search DTT component may treat the combination of the DTT database, an integrated data security layer database as a single database entity.

In one embodiment, user programs may contain various user interface primitives, which may serve to update the DTT. Also, various accounts may require custom database tables depending upon the environments and the types of clients the DTT may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemization and/or storage devices. Similarly, configurations of the decentralized database controllers may be varied by consolidating and/or distributing the database components 519a-519b. The DTT may be configured to keep track of various settings, inputs, and parameters via database controllers.

The DTT database may communicate to and/or with other components in a component collection, including itself, and/or facilities of the like. Most frequently, the DTT database communicates with the DTT component, other program components, and/or the like. The database may contain, retain, and provide information regarding other nodes and data.

The DTT component 535 is a stored program component that is executed by a CPU. In one embodiment, the DTT component incorporates any and/or all combinations of the aspects of the DTT that was discussed in the previous figures. As such, the DTT affects accessing, obtaining and the provision of information, services, transactions, and/or the like across various communications networks.

The DTT component enables controlled parameter space search for data system throughput determination by providing signals coordinating the various components of the DTT, and/or the like and use of the DTT.

The DTT component enabling access of information between nodes may be developed by employing standard development tools and languages such as, but not limited to: APACHE COMPONENTS, ASSEMBLY, ACTIVEX, BINARY EXECUTABLES, (ANSI) (OBJECTIVE-) C (++), C# AND/OR .NET, DATABASE ADAPTERS, CGI SCRIPTS, JAVA, JAVASCRIPT, MAPPING TOOLS, PROCEDURAL AND OBJECT ORIENTED DEVELOPMENT TOOLS, PERL, PHP, PYTHON, shell scripts, SQL commands, web application server extensions, web development environments and libraries (e.g., MICROSOFT'S ACTIVEX; ADOBE AIR, FLEX & FLASH; AJAX; (D)HTML; DOJO, JAVA; JAVASCRIPT; JQUERY(UI); MOOTOOLS; PROTOTYPE; SCRIPT.ACULO.US; SIMPLE OBJECT ACCESS PROTOCOL (SOAP); SWFOBJECT; YAHOO! USER INTERFACE; and/or the like), WebObjects, and/or the like. In one embodiment, the DTT server employs a cryptographic server to encrypt and decrypt communications. The DTT component may communicate to and/or with other components in a component collection, including itself, and/or facilities of the like. Most frequently, the DTT component communicates with the DTT database, operating systems, other program components, and/or the like. The DTT may contain, communicate, generate, obtain, and/or provide program component, system, user, and/or data communications, requests, and/or responses.

The structure and/or operation of any of the DTT node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DTT controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: APPLICATION PROGRAM INTERFACES (API) INFORMATION PASSAGE; (DISTRIBUTED) COMPONENT OBJECT MODEL ((D)COM), (DISTRIBUTED) OBJECT LINKING AND EMBEDDING ((D)OLE), and/or the like), COMMON OBJECT REQUEST BROKER ARCHITECTURE (CORBA), local and remote application program interfaces JINI, REMOTE METHOD INVOCATION (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by LEX, YACC, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

What is claimed is:

1. A data throughput testing system, comprising:
a memory; and
a processor disposed in communication with the memory, and configured to issue a plurality of processing instructions stored in the memory, wherein the processor issues instructions to:
obtain one or more generation parameters;
perform a test run, including:
generate, based on the generation parameters, one or more input streams of electronic data;
provide the input streams to a data system under test;
obtain one or more output streams of electronic data from the data system under test;
compare the input streams with the output streams; and
determine one or more performance parameters based on the comparison of the input streams with the output streams;
obtain one or more benchmark parameters;
compare the performance parameters against the benchmark parameters;
determine if another test run needs to be performed based on the comparison of the performance parameters against the benchmark parameters;
generate updated generation parameters based on the performance parameters if it is determined that the test run needs to be performed again;
iteratively perform the test run, compare the performance parameters against one or more benchmarks, determine if another test run needs to be performed, and generate updated generation parameters until it is determined that the test run need not be performed again; and
store one or more of the performance parameters if it is determined that the test run need not be performed again.

2. The system of claim 1, further comprising:
a traffic generation system disposed in communication with the processor and configured to provide the input streams; and
a traffic reception system disposed in communication with the processor and configured to obtain the output streams.

3. The system of claim 1, wherein a subset of the generation parameters includes lengths of the input streams.

4. The system of claim 1, wherein a subset of the performance parameters includes rates of generation of the input streams.

5. The system of claim 1, wherein a subset of the performance parameters includes numbers of data packets lost in the output streams compared to the input streams.

6. The system of claim 1, wherein a subset of the benchmark parameters includes zero rates of loss of data packets in the output streams.

7. The system of claim 1, wherein a subset of the benchmark parameters includes non-zero threshold values for rates of loss of data packets in the output streams.

8. The system of claim 1, wherein at least one benchmark parameter is based on the generation parameters.

9. The system of claim 1, wherein a subset of the stored performance parameters includes rates of generation of the input streams.

10. The system of claim 1, wherein a subset of the stored performance parameters includes rates of loss of data packets in the output streams compared to the input streams.

11. The system of claim 1, wherein a subset of the performance parameters includes rates of loss of data packets in the output streams compared to the input streams.

12. The system of claim 11, wherein the processor further issues instructions to: determine if the test run needs to be performed again is based on the subset of performance parameters that includes rates of loss of data packets in the output streams.

13. The system of claim 1, wherein a subset of the generation parameters includes rates of generation of the input streams.

14. The system of claim 13, wherein generate an updated subset of the generation parameters that includes rates of generation of the input streams is based on a subset of the performance parameters that includes rates of loss of data packets in the output streams compared to the input streams.

15. The system of claim 13, wherein generating an updated subset of the generation parameters that includes rates of generation of the input streams is based on a subset of the performance parameters that includes rates of generation of the input streams.

* * * * *